3,780,038
PROCESS OF PREPARING AN AMINO THIAZOLYL DISULFIDE USING WET 2-MERCAPTOBENZOTHIAZOLE
Richard Leshin and William L. Cox, Akron, Ohio, assignors to The Goodyear Tire & Rubber Company, Akron, Ohio
No Drawing. Filed Aug. 4, 1971, Ser. No. 169,056
Int. Cl. C07d 87/46
U.S. Cl. 260—247.1                        7 Claims

ABSTRACT OF THE DISCLOSURE

In a known process for preparing 2-(4-morpholinodithio)-benzothiazole using 2-mercaptobenzothiazole along with morpholine, sulfur, an inert organic solvent such as isopropyl alcohol and an oxidizing agent, the improvement wherein wet 2-mercaptobenzothiazole is substituted for dry 2-mercaptobenzothiazole.

---

This invention relates to a process of preparing 2-(morpholinodithio)-benzothiazole, MDB, using wet 2-mercaptobenzothiazole, MBT. More particularly this invention relates to the elimination of a drying step in the preparation of MBT for use as a reactant in the preparation of MDB.

The reaction involving MBT and/or the corresponding benzothiazolyl disulfide, MBTS, morpholine, sulfur, isopropyl alcohol and an oxidizing agent to prepare MDB is well known in the art (U.S. Pat. 3,281,418). From a commercial standpoint, it is desirable that process costs be as low as possible. MBT is generally prepared in aqueous systems. Slurries of this compound are normally filtered and the filter cake dried. The dried compound is then used in the aforementioned process to produce MDB. If wet MBT could be used in the preparation of MDB, the drying step used in the preparation of the MBT could be eliminated. Although the prior art teaches the use of dry MBT in the manufacture of MDB, no mention is made of the use of the wet forms of this compound. Presumably those repsonsible for the prior art believed that the presence of an excess amount of water could result in process problems including decreased yield and purity. Since the reaction mixture is basically of an organic nature, the presence of an excess amount of such an inorganic polar compound such as water could result in reduced solubility of one or more of the reactants and/or the reaction product and therefore possibly result in lower yields and purities.

It is an object of the present invention to provide an economical process for preparing MDB. It is another object of this invention to use wet MBT in the preparation of MDB. It is still another object of this invention to provide a process of preparing MDB in high yields and high purities using wet MBT.

The objects of this invention are accomplished by reacting wet MBT along with morpholine and sulfur using an inert organic solvent, preferably an aliphatic alcohol having 3 to 5 carbon atoms, as a vehicle in the presence of an oxidizing agent. The present process differs most significantly from the specific disclosures of the prior art in that the MBT is wet, that is, has a moisture content of from about 20 percent to about 60 percent.

The specific teachings of the prior art pertaining to the use of MBT relate only to its use in a dry form. However, in spite of this fact, it was discovered that MBT possessing a high water content could be used successfully in the present process to produce MDB in high yields and high purities. Since the MBT is normally prepared in aqueous systems, the present process permits the use of moist filter cakes of said compounds thereby eliminating a drying step in their preparation.

As indicated earlier herein, U.S. Pat. 3,281,418 reveals that MBTS can be used rather than MBT in the preparation of MDB. However, when wet MBTS was used in the preparation of MDB, it was found that the system containing wet MBTS had a lower tolerance to water than a system containing wet MBT.

In U.S. Pat. 3,281,418, the contents of which are incorporated herein by reference, the mixture of morpholine, sulfur, an inert organic solvent and the MBT must be heated to a temperature above the crystallization point of said mixture before the oxidizing agent is added and the oxidizing agent must be added prior to the crystallization of any of the MDB. In the example in said patent where MBT is used (Example 2), the MBT is dry. In the present process wet MBT is used, the mixture need not be heated to a temperature above its crystallization point, and the oxidizing agent need not be added prior to crystallization of the MDB.

The present process is ideally suited for the use of MBT which has been prepared in an aqueous system where the MBT is formed as an aqueous slurry and is subsequently separated from said slurry, for example, by filtration. The wet MBT can have a moisture content of from 20 percent to 60 percent, i.e., the water content of the MBT can be from 25 to 150 parts by weight of water per 100 parts by weight of MBT. Centrifugal filtration can result in a moisture content of less than 40 percent. It is preferred that the water content of the wet MBT be from about 20 percent to 54 percent (117 parts of water), most preferably from about 20 to about 40 percent (67 parts of water) by weight particularly where the present process is being carried out in a continuous manner. In all cases the MBT of the present process never has a moisture content of less than 20 percent nor more than 60 percent. In addition, the total water content of the mixture of morpholine, sulfur, solvent and wet MBT can never exceed 150 parts by weight of water per 100 parts by weight of dry MBT, preferably never exceeds 117 parts, and most preferably never exceeds 67 parts.

The present process can be carried out in either a batchwise or continuous fashion. In either case the morpholine, sulfur, solvent and wet thiazole are combined to form a combination which is then combined with the aqueous oxidizing agent. In the batch-wise process of the aqueous solution of the water soluble oxidizing agent is normally added to the combination under agitation. In the continuous process the combination and the aqueous solution are combined continuously.

Batch reactions indicate that preferably 5 to 12.5 percent excess sulfur, 10 to 15 percent excess morpholine and 20 to 24 percent excess oxidizing agent are used and that the oxidizing agent is added in 7 minutes. By "excess" is meant the percent of a reactant charged beyond that required for exact stoichiometry. Naturally optimum conditions will possibly vary depending on such factors as reactor size, degree of agitation and whether the reaction is of a batch-wise or continuous nature.

The following examples illustrate the preparation of 2-(4-morpholinodithio)-benzothiazole. Such examples are intended to illustrate and not to limit the practice of the present invention.

EXAMPLE 1

The following reactants were reacted as described below.

Ingredients:                                                         Grams
Wet MBT filter cake (48.3 weight percent
  $H_2O$, purity of MBT on dry basis, 96.1%) _ 134.3
Sulfur (12.5% excess) _____ 14.4
Morpholine (15% excess) _____ 40.1
2-propanol/$H_2O$ azeotrope _____ 113.6
Aqueous sodium hypochlorite, 2.15 molar
  (24% excess), 231 ml.

The wet MBT, sulfur, morpholine and 2-propanol/ water azeotrope were combined, stirred and heated to 60° C. A portion of the hypochlorite solution (115 milliliters) was added in one minute causing the temperature to rise rapidly to reflux. The remainder of the hypochlorite solution was added over a 6 minute period at reflux. The mixture was stirred for an additional 3 to 4 minutes at which time the product precipitated spontaneously (in some instances it is necessary to add seed crystals to induce precipitation). Seven hundred milliliters of water at 25° C. were added to the mixture thereby dropping the temperature of the slurry to 60° C. The mixture was stirred for one-half hour while cooling the mixture to 40 to 45° C. The solid product was filtered and washed with water. The product was then dried in air at 40° C. The yield was 101.9 grams (89%). The melting point was 123 to 129° C. The purity was above 95 percent.

The reaction of Example 1 can also be run in a continuous manner by continuously combining the heated mixture of wet thiazole, sulfur, 2-propanol and morpholine with the aqueous sodium hypochlorite.

EXAMPLES 2 TO 15

Examples 2 to 15 illustrate the effect of various water contents on yield and purity. Wet MBT was not used. Rather, it was simulated by using dry MBT and adding water to the mixture. Sulfur, MBT, 2-propanol and water were charged to a flask. Morpholine was added and the mixture heated to between 65° C. and reflux (approximately 80–83° C.). Aqueous sodium hypochlorite was added through an addition funnel while the reaction mixture was vigorously stirred. The mixture was refluxed and then quenched by the addition of water. The mixture was then allowed to cool below 40° C. It was then filtered, water washed and dried at 40° C.

Yield and purity results are listed in the following table.

| Example a | Water (grams) | Water content of wet MBT (weight percent) | Product Percent Yield | Product Percent Purity | Melting point (° C.) |
|---|---|---|---|---|---|
| 2 | b 0 | 0 | 94 | 98 | 111–120 |
| 3 | 20 | 37 | 91 | 95 | 111–121 |
| 4 | 21 | 39 | 91 | 98 | 111–120 |
| 5 | 30 | 47 | 90 | 96 | 119–124 |
| 6 | 37 | 52 | 88 | 97 | 111–124 |
| 7 | 37 | 52 | 87 | 96 | 119–127 |
| 8 | c 84 | 54 | 88 | 97 | 125–127 |
| 9 | d 84 | 54 | 87 | 95 | 124.5–126 |
| 10 | b 40 | 54 | 90 | 96 | 111–121 |
| 11 | 40 | 54 | 89 | 98 | 112–123 |
| 12 | 40 | 54 | 91 | 97 | 112–122 |
| 13 | 50 | 60 | 89 | 93 | 110–121 |
| 14 | 60 | 64 | 87 | 93 | 110–121 |
| 15 | 70 | 68 | 87 | 92 | 110–121 | a MBT, .20 gram mole; sulfur, 10% excess; morpholine, 10% excess; aqueous sodium hypochlorite solution, 20% excess; isopropyl alcohol, 50 grams; $t_B$, 7 min.; $t_R$ 4 min.; $V_Q$ 500 ml.
b 12% excess morpholine instead of 10%.
c MBT (95.6% purity), .40 gram mole; sulfur, 12.5% excess; morpholine, 15% excess; aqueous sodium hypochlorite solution, 24% excess; isopropyl alcohol, 100.5 grams; $t_B$, 7 min.; $t_R$, 4 min.; $V_Q$, 200 ml.
d Same as footnote c except 10% excess sulfur, 12% excess morpholine, 20% excess aqueous sodium hypochlorite solution.

The aqueous sodium hypochlorite solution was made up of 12½ parts of sodium hypochlorite in 100 parts of solution. The abbreviations $t_B$, $t_R$ and $V_Q$ have the following meanings.

$t_B$ is the bleach addition time in minutes; $t_R$ is the reaction time in minutes after bleach addition prior to the addition of the quench water; $V_Q$ is the volume of quench water in milliliters.

Examples 3 to 13 are within the scope of the invention. If larger amounts of water such as 80 and 90 parts were used, yields and purities would be expected to drop even further. A purity of about 95 percent and above is desirable. A yield of 87 to 91 percent is considered satisfactory.

Therefore MBT containing 20, 25, 30 and even up to 60 percent moisture can be used satisfactorily within the practice of the present invention.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing 2-(4-morpholinodithio)-benzothiazole comprising combining a mixture of morpholine, sulfur, an inert organic solvent and wet 2-(mercaptobenzothiazole) with an aqueous solution of a water soluble oxidizing agent wherein the wet 2-(mercaptobenzothiazole) contains 25 to 150 parts by weight of water per 100 parts by weight of 2-(mercaptobenzothiazole), with the proviso that the maximum water level in the morpholine, sulfur, solvent, 2-(mercaptobenzothiazole) mixture, prior to combining the mixture with the oxidizing agent, is 150 parts by weight of water per 100 parts by weight of 2-(mercaptobenzothiazole) and wherein the wet 2-(mercaptobenzothiazole) is the wet separated product resulting from the preparation of 2-(mercaptobenzothiazole) in an aqueous system to form an aqueous slurry from which the 2-(mercaptobenzothiazole) is separated.

2. The process according to claim 1 wherein the 2-mercaptobenzothiazole is in the form of a filter cake.

3. The process according to claim 1 wherein the process is continuous, the morpholine, sulfur, thiazole and solvent being in one stream and the water soluble oxidizing agent being in an aqueous stream, the two streams being combined continuously.

4. The process according to claim 1 wherein the water soluble oxidizing agent is rapidly added to the mixture of the morpholine, sulfur, solvent and wet thiazole prior to the crystallization of the 2-(4-morpholinodithio)-benzothiazole.

5. The process according to claim 1 wherein the solvent is an aliphatic alcohol containing 3 to 5 carbon atoms.

6. The process according to claim 1 wherein the solvent is isopropyl alcohol and the water soluble oxidizing agent is sodium hypochlorite.

7. The process according to claim 1 wherein the wet 2-mercaptobenzothiazole contains 25 to 67 parts by weight of water per 100 parts by weight of the 2-mercaptobenzothiazole and wherein the total water level in the mixture does not exceed 67 parts by weight of water per 100 parts by weight of 2-mercaptobenzothiazole.

References Cited
UNITED STATES PATENTS
3,281,418    10/1966    Budd et al.    260—247.1

ALEX MAZEL, Primary Examiner

J. TOVAR, Assistant Examiner